Oct. 24, 1967  R. C. KNUTSON  3,348,299
METHOD OF APPLYING ELECTRICAL CONTACTS
Original Filed Sept. 3, 1963

INVENTOR.
ROBERT C. KNUTSON
BY
Dugger, Johnson & Westman
ATTORNEYS ns # United States Patent Office 3,348,299
Patented Oct. 24, 1967

3,348,299
METHOD OF APPLYING ELECTRICAL CONTACTS
Robert C. Knutson, Rosemount, Minn., assignor to Rosemount Engineering Company, Minneapolis, Minn., a corporation of Minnesota
Original application Sept. 3, 1963, Ser. No. 306,378, now Patent No. 3,237,138, dated Feb. 22, 1966. Divided and this application Sept. 14, 1965, Ser. No. 487,185
5 Claims. (Cl. 29—578)

This application is a division of co-pending application Ser. No. 306,378, filed Sept. 3, 1963, now Patent No. 3,237,138, for Integral Strain Transducer, which in turn was a continuation-in-part of application Ser. No. 222,-449, filed Sept. 10, 1962 for Integral Strain Transducer, now abandoned.

This invention relates to strain transducers and more particularly to a unique method of making electrical contacts on the surfaces of non-metallic devices which permit use of such devices over a very wide temperature range.

The contacts can be applied to objects made of many types of material in this manner. A contact zone can be made by roughening the surface of the object in the contact locations. A suitable contact material (electrical conductor) is deposited on the surface over the roughened area and in a strip adjacent the roughened area on top of a smooth portion of the surface of the object. The deposited material will adhere to the roughened area, thereby forming contacts with integral leads that will withstand very wide temperature extremes. Extensions to the integral leads can be attached by known procedures. Other variations of the high temperature contacts will be more fully explained later.

It is an object of the present invention to present a transducer that is operable over a wide range of temperature.

Other objects are those inherent in the invention herein illustrated, described and claimed and will be apparent as the description proceeds.

Figure 1:
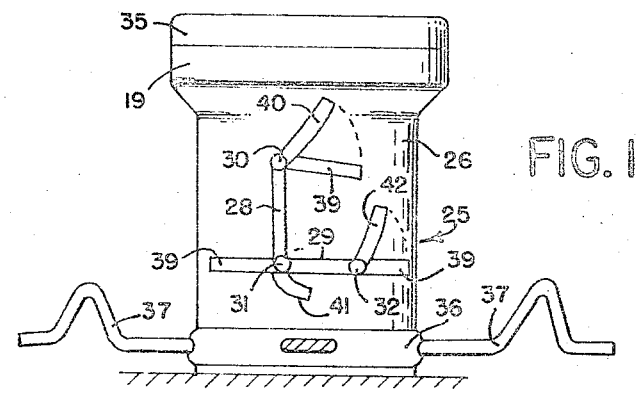
FIGURE 1 is a side elevational view of a cylindrical semi-conductor strain transducer having contacts thereon made according to the method of the present invention.

In FIGURE 1 there is shown a semi-conductor transducer which can be used in extremely high temperature work. The transducer illustrated is a hollow cylindrical unit that has a thin outer wall on which spaced contacts electrically and mechanically fixed to the wall are placed. The material between the contacts form current paths. The resistance of the wall between the contacts will change with stress and the resistance change will be measured to determine the stress level. The transducer shown is used in pressure gauges, primarily as shown in the parent application Ser. No. 306,378. In order to measure the change of resistance, the contacts on the wall of the transducer are electrically connected into a bridge circuit and the paths between spaced contacts form arms of the bridge. This permits measurement of the change of resistance between the contacts. For low temperature applications the contacts or terminals on the transducer may be plated onto the silicon and then lead wires soft soldered to these contacts. Soft solder, of course, cannot withstand elevated temperatures and the effective temperature range of the transducers is thus limited.

In FIGURE 1, there is shown a transducer 25 which comprises a silicon (or other semi-conductor material) cylinder 26. The cylinder is hollow, forming a thin outer wall and has a thick reinforcing ring 19 at one end. The cylinder is formed with one open end and one closed end.

After forming, the cylinder is cleaned thoroughly so that no foreign deposits are on the surface thereof. Then the surface of the cylinder is "doped." As disclosed, the cylinder is "doped" by subjecting it to phosphorus pent-oxide vapor at an elevated temperature. The phosphorus pentoxide and the silicon cylinder are placed within a tube, heated and the phosphorus pentoxide is atomically bonded to the silicon. The impurities in the silicon from doping may amount to about one hundred parts per million. However, this increases the electrical conductivity of the silicon in the doped layer tremendously.

The cylinder is quite heavily doped so that there is a relatively thick coating of doped silicon at the surface of the cylinder.

After the doping process has been completed, the cylinder is covered with a photosensitive emulsion and is exposed to light in the area where the current paths and contacts or terminals for the transducer are to be. The emulsion hardens in the exposed area. The device is then etched in a suitable solution of acid to remove the doped coating from the cylinder in all but the exposed areas. As shown in FIGURE 1, the exposed areas are the lines 28, 29, which are arranged 90 degrees to each other, and also the circular contact points 30, 31 and 32. These lines, as will be more fully explained, are more conductive than the pure silicon and will form current paths when the transducer is used. The transducer is a single crystal of N-type silicon, and the paths are oriented to be in the (100) direction and (101) direction of crystallographic orientation, respectively.

After the doped coating has been etched from the surfaces of the cylinders in all but the desired current paths and contact areas, the cylinder is then subjected to oxygen at an elevated temperature to grow a surface oxide coating which helps to prevent any further doping on the surface in subsequent operations. Also, the oxide coating helps prevent depositing of contact material in other than the desired locations.

In this stage of operation, a glass disc seal 35 can be applied to the open end of the cylinder and sealed thereon, if desired, to seal the interior chamber of the hollow cylinder and make it pressure tight.

Also, as shown for the sake of clarity in FIGURE 1, a second glass disc 36 can be bonded to the closed end of the cylinder and platinum-rhodium alloy ribbons 37 bonded into the glass disc for mounting the transducer in its environment. The ribbons can be attached to a mounting member to hold the transducer in proper position. If the transducer is mounted within an outer case, the ribbons are fixed to the case to hold the transducer in proper position.

After the glass seal 35 has been bonded to the open end of the cylinder and the unit has cooled, the oxide coating on the outside of the cylinder is mechanically abraded away or etched away in the round contact areas 30, 31 and 32. The oxide coating is left intact on the rest of the cylinder including lines or paths 28 and 29.

The contacts are then put in place in the contact areas as disclosed, by an electroless process of nickel plating, which is well known in the art. The process generally is immersing the silicon cylinder in a suitable bath having a suitable nickel salt in solution and which is warmed to about 90° C. The nickel in solution in the bath will become deposited on the surface of the silicon. The nickel will not deposit on the oxide coating covering the majority of the cylinder surfaces.

After the contact areas have been built up sufficiently with nickel, the transducer is removed from the bath and contacts are then sintered in place. This sintering process greatly strengthens the bond between the silicon and the nickel and insures that there is a good mechanical and electrical connection therebetween. The nickel contacts, it should be noted, are bonded to the "doped" coating on the cylinder surface.

While metals other than nickel can be used for the contacts, nickel has been found to give a very wide range of temperature usage without alloying with the silicon. For example, gold can be used in the contact areas, but gold alloys with the silicon at 370° C. and destroys the properties of the transducer. Thus, the maximum temperature at which a transducer having gold contacts thereon can be used is 370° C. Nickel does not have any deleterious effects such as this until a temperature of over 700° C. is reached. In addition, it is known that rhodium will work as a contact metal but again has to be used at a much lower maximum temperature than nickel.

In order to eliminate the soft soldering of lead wires onto the nickel contacts, a unique process of making high temperature connections is utilized. Once the nickel contacts have been sintered in place, small strips of the oxide coating on the cylinder's outer surface are etched away adjacent each of the contacts 30, 31 and 32. These strips are indicated at 39. Thus, the silicon is exposed in the area of the strips. The transducer is then again placed in the electroless plating bath and nickel is deposited on top of the contacts 30, 31 and 32 and also in the area defined by the strips 39. The nickel deposited in the bath at this time will adhere very well to the nickel originally deposited, both because of a relatively rough surface on the top of the nickel contacts and also because of the fact that they are the same metal. However, the nickel deposited in the strips 39 will not be firmly bonded to the surface of the silicon cylinder.

When a continuous thin ribbon of nickel has been deposited in each of the strips 39, the transducer is removed from the plating bath. A sharp instrument, such as a razor blade, is then inserted under each of the deposited ribbons of nickel and the ribbons are lifted up. These ribbons are 40, which is a lead adhering to contact 30, ribbon 41 which is a lead adhering to contact 31, and ribbon 42 which is a lead adhering to contact 32.

The connection between the lead ribbons and their respective contacts will withstand as high a temperature as the contacts themselves. Thus, it can be seen that the need for soft soldering is eliminated. The lead wire junction no longer limits the temperature range of operation of the transducer.

The ribbons can be lifted from the surfaces of the cylinder after plating because the cylinder surface is very smooth after the etching operation which removes the oxide coating in the ribbon areas, and also the ribbons are not sintered after they are deposited on the surface of the cylinder. Thus, a strong bond is not made between the silicon and the ribbons of deposited nickel material. However, at the contacts, the bonds between the nickel ribbons and the nickel contacts is sufficiently strong to withstand normal usage, and a good electrical connection is made.

The transducer can then be connected in a standard bridge circuit with the resistance paths forming arms of the bridge.

If desired, a full bridge can be made by adding two more current paths to the transducer parallel to lines 28 and 29 to complete a square pattern. It is also obvious that only one current path, for example, line 28 can be used with two contacts, if desired.

Figure 2:
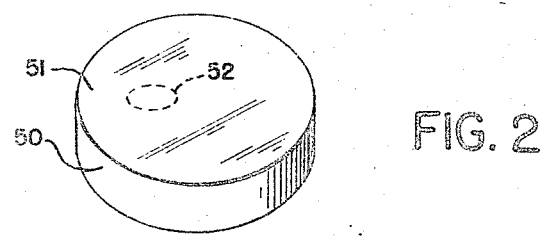
FIGURE 2 is a perspective view of a piece of semi-conductor material on which an electrical current conducting contact is to be made.

The depositing process for making high temperature contacts as described in connection with FIGURE 1 can be used on many materials. For example, referring to FIGURES 2 through 4, a wafer 50, which is comprised as a disc of material, such as semi-conductor, is to be used in an application requiring an electrical contact capable of withstanding high temperatures on the surface thereof. In applying this contact and making it utilizable under high temperature operations, a top surface 51 of the wafer is smoothed in suitable manner, as by etching, so that the surface is very smooth. A contact zone 52 is roughened in a suitable manner, such as lapping, in the desired contact area of the wafer. This roughened portion can be of any size, according to the dictates of the usage. Care is taken to insure that the surface 51 in the portions adjacent the contact zone 52 remain smooth.

The top surface 51 is then masked with a suitable material in the portions illustrated at 53. The masking can be done by any desired means, such as placing an oxide in the areas depicted by the shading 53. The contact zone 52 and a strip 54 are left unmasked. The smooth surface of the disc or wafer 52 is exposed in the strip 54. In other words, the parent material of the wafer is exposed in the strip area 54.

The masking of the portions 53 can be done with a suitable pressure sensitive coating or through use of a suitable adhesive, instead of applying an oxide coating in these areas. Photoemulsion masking is widely used and can also be used in this application.

Figure 3:
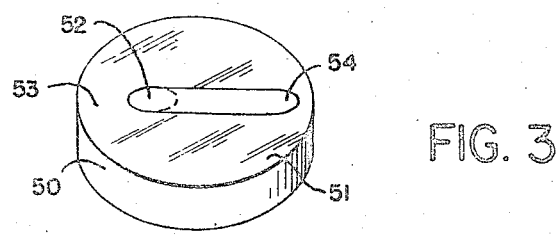
FIGURE 3 is a perspective view of the device of FIGURE 2 after a contact has been deposited on the surface thereof.
Figure 4:
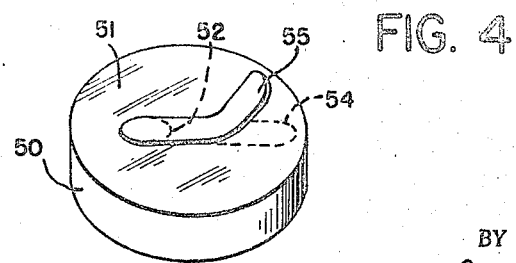
FIGURE 4 is a perspective view of the device of FIGURE 3 after an electrical current conducting tab or lead has been raised from the surface of the device.

The wafer or disc is then subjected to a suitable process for depositing an electrical conductive material, for example a metal such as nickel, in the unmasked areas of the top of the wafer as illustrated in FIGURE 3. The process can be electroless plating or vacuum evaporation, for example.

The material deposited will adhere to the roughened portions of the contact zone 52 very tightly. However, on the smooth surfaces in strip 54, the bond between the parent material of the wafer and the deposited material will be imperfect.

The material is deposited until a continuous strip or ribbon of desired thickness is built up. As shown in FIGURE 3, the strip or ribbon of material 55 deposited in the unmasked strip 54 can then be lifted up from the surface of the wafer with a sharp instrument such as a razor blade. The deposited material will adhere tightly in the contact zone 52 because of the roughened surface.

Other variations of the method can be employed, for example depositing material only in the roughened area 52 first, then sintering the deposited material of the contact zone in order to enhance the bond between the parent material of wafer 52 and the first deposited material, then masking the strip areas adjacent the contact zone and depositing an additional layer of material over the contact material and in the strip areas. The material deposited the second time will adhere to the contact, as the upper surfaces of the contact will be relatively rough. Also, the contact will be of the same material as the material deposited in the second operation and thus a better bond will be obtained. This was also pointed out in the description of the method used in connection with FIGURE 1.

What is claimed is:

1. The method of making electrical contacts on the surface of a member made of a semi-conductor material, comprising the steps of:

providing a roughened portion and a smooth portion on the surface of said semi-conductor material member, depositing a suitable material on said roughened portion and on a strip shaped part of said smooth portion contiguous to and adjacent said roughened portion, the said deposited material comprising an integral layer having a strong bond with the roughened portion and a weak bond with the smooth portion, and lifting the strip-shaped material from said smooth surface portion in the areas adjacent said roughened portion.

2. The method of making an electrical contact on a member comprising the steps of:

treating the surface of said member to have a roughened area in a contact zone and a smooth area contiguous to said contact zone and extending therefrom, depositing a first layer of suitable conductive material on said contact zone, heat treating said member to improve the bond between said deposited material and said contact zone, depositing a second layer of said conductive material over said previously deposited contact zone in strongly bonded relation thereto and simultaneously on the smooth surface of said member in weakly bonded relation thereto in areas adjacent and contiguous to said contact zone, and lifting a strip of said weakly bonded material deposited adjacent said contact zone from the surface of said member.

3. The combination as specified in claim 2 wherein the surface of said member is treated to prevent depositing of said conductive material on said surface of said member except in said contact zone and a strip shaped area contiguous to said contact zone after the first layer of material is deposited in said contact zone.

4. The method of applying electrical contacts on the surface of a semi-conductor transducer comprising the steps of:

cleaning and smoothing the surface of the transducer, doping a layer adjacent the surface of the transducer by adding preselected impurities to said layer, etching away the doped layer except in portions which are to form current paths, roughening the surface of the transducer in two spaced locations, masking the surface of said transducer so as to leave exposed the roughened portions and two separate strips, each strip joining one of the roughened portions, depositing a layer of a suitable electrically conductive material on said transducer surface in the unmasked areas, and inserting a sharp instrument under each of the deposited strips and lifting the portions thereof remote from the said roughened portions from the surface of the transducer.

5. The method of making a current path on the surface of a semi-conductor transducer comprising the steps of:

cleaning the surface of the transducer;

doping a layer adjacent the surface of the transducer by adding preselected impurities to the surface portions of the material of said transducer, etching away the doped layer except in portions which are to form current paths, subjecting said transducer to oxygen at an elevated temperature to form an oxide on the surface thereof, removing the oxide coating in at least two spaced locations on the current path area of said transducer, depositing a suitable metallic material on said transducer in the areas where said oxide coating was removed, sintering said transducer to form a bond between said metallic coating and said transducer material, removing the oxide coating form said transducer surface in strip areas adjacent to and joining each of the portions that has a metallic coating, depositing a thin metallic ribbon in said strip areas and joining said portion previously plated, and lifting the portions of said ribbons remote from said previously plated areas from the surface of said transducer.

References Cited
UNITED STATES PATENTS

| | | | |
|---|---|---|---|
| 2,793,420 | 5/1957 | Johnston | 29—155.5 |
| 2,900,580 | 8/1959 | Beck | 29—155.5 X |
| 2,962,394 | 11/1960 | Andres | 117—213 |
| 2,981,877 | 4/1961 | Noyce. | |
| 3,022,570 | 2/1962 | Taylor | 29—155.71 X |
| 3,046,176 | 7/1962 | Bosenberg | 29—155.5 X |
| 3,231,421 | 1/1966 | Schmidt | 117—213 X |

WILLIAM I. BROOKS, *Primary Examiner.*